Jan. 4, 1927.　　　S. LUCHKANICH ET AL　　　1,613,115
CAR COUPLER
Filed Dec. 9, 1925　　　2 Sheets-Sheet 1
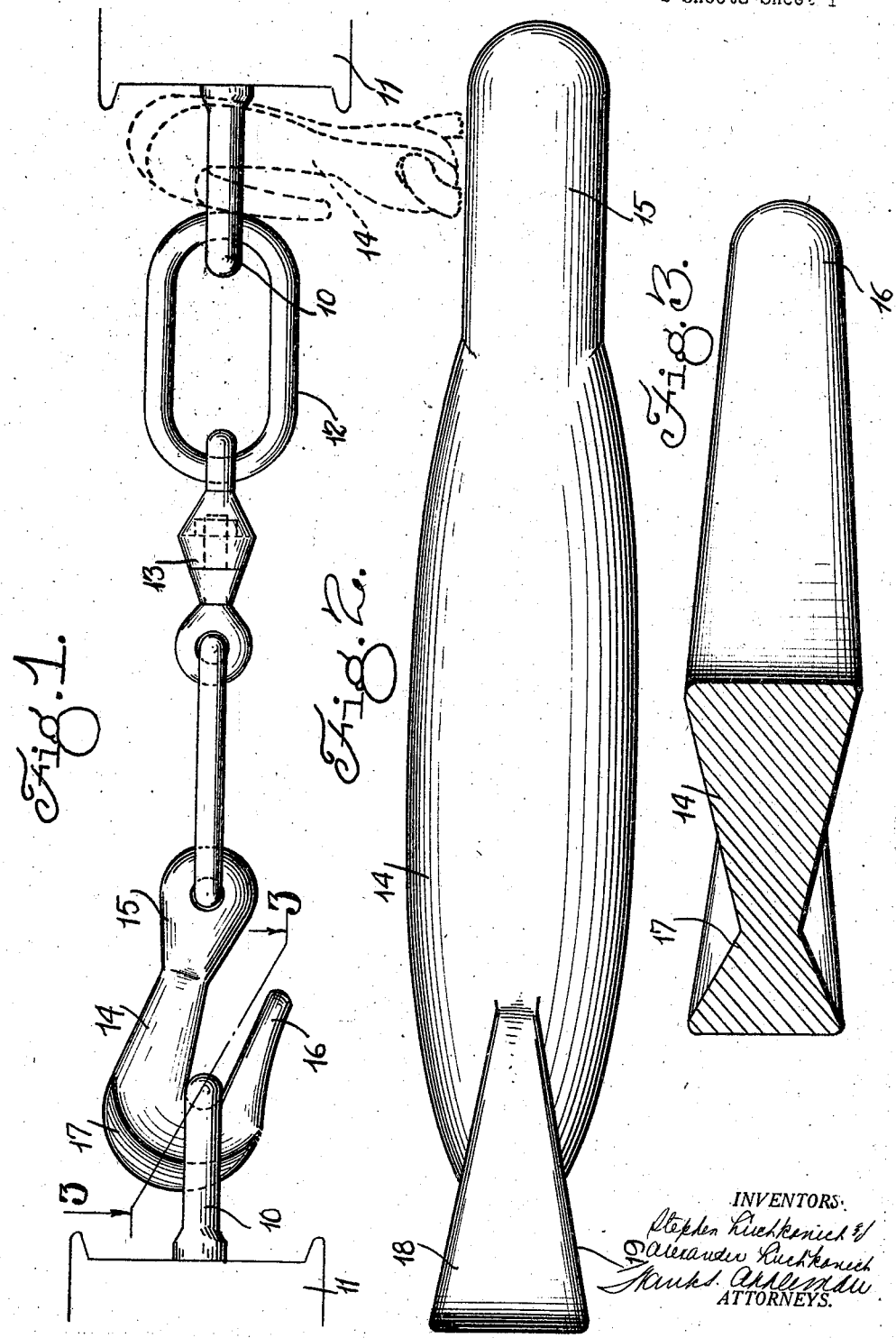

Jan. 4, 1927. 1,613,115
S. LUCHKANICH ET AL
CAR COUPLER
Filed Dec. 9, 1925 2 Sheets-Sheet 2
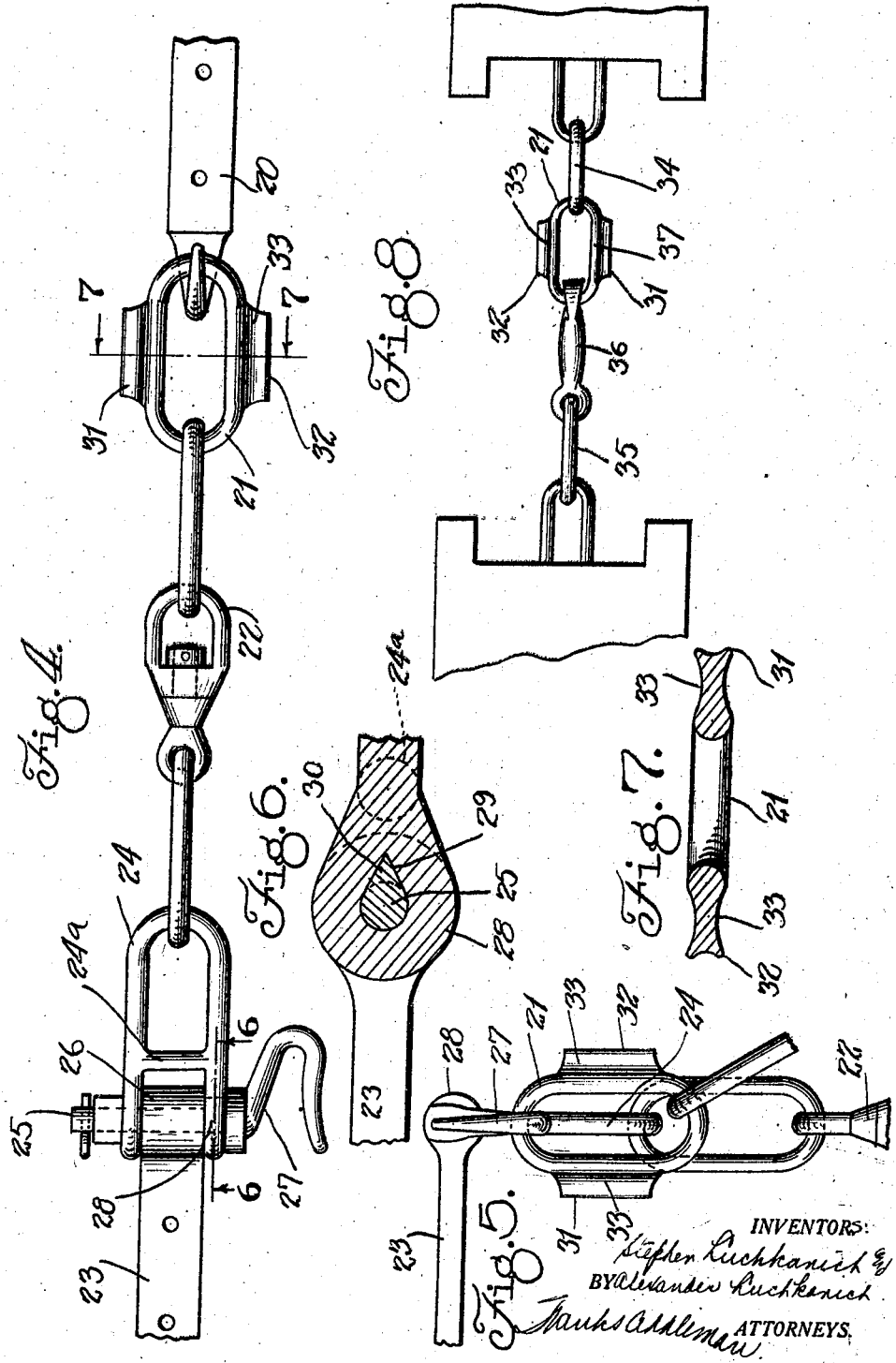
INVENTORS:
Stephen Luchkanich &
BY Alexander Luchkanich
ATTORNEYS.

Patented Jan. 4, 1927.

1,613,115

UNITED STATES PATENT OFFICE.

STEPHEN LUCHKANICH AND ALEXANDER LUCHKANICH, OF MAYFIELD, PENNSYLVANIA.

CAR COUPLER.

Application filed December 9, 1925. Serial No. 74,346.

This invention relates to car couplings, and particularly to couplings for mine cars.

In the mine equipment now in use, the cars are usually connected by chain couplings and one of the cars is provided with a loop or link engaged by a hook on a chain attached to the opposite car, although in other equipments one of the cars is provided with a stationary hook and the other car to be coupled to it has a chain with a link that is caused to engage the stationary hook, and in some instances, the cars are coupled by chains, one of which has an end link and the other a hook.

In devices now in use, the coupling members are cumbersome and difficult of manipulation, and owing to their clumsy construction, they cause accidents, in that the hands of the operator are caught between the interengaging parts when attempts are made to manipulate them for coupling or uncoupling the elements.

It is an object of this invention to provide novel means whereby hooks or links may be expeditiously manipulated and provided with hand holds whereby force may be applied for hooking or unhooking the couplings.

It is a further object of this invention to provide an equipment of the kind noted whereby the couplers which are attached to chains may be suspended clear of the roadbed to prevent their dragging and catching on obstructions that might be in the path of travel of the coupling; and it is a still further object of this invention to provide novel means whereby the links of the chain will assume operative positions practically regardless of the way in which they are manipulated during the coupling or uncoupling operation.

It is furthermore an object of this invention to produce couplings of the character indicated which can be manufactured without any appreciable additional cost, as compared with the normal equipment.

With the foregoing and other objects in view, the invention consists in the details of construction, and in the arrangement and combination of parts to be hereinafter more fully set forth and claimed.

In describing the invention in detail, reference will be had to the accompanying drawings forming part of this application wherein like characters denote corresponding parts in the several views, and in which—

Figure 1 illustrates a view in elevation of a coupling showing a chain and hook embodying the invention;

Figure 2 illustrates an enlarged detail view of the hook;

Figure 3 illustrates a sectional view of the hook on the line 3—3 of Fig. 1;

Figure 4 illustrates a plan view of a modified equipment;

Figure 5 illustrates a view in elevation of one of the anchoring devices showing the coupling suspended;

Figure 6 illustrates an enlarged sectional view on the line 6—6 of Fig. 4;

Figure 7 illustrates a sectional view on the line 7—7 of Fig. 4 omitting the parts of the chain connected to the link; and Figure 8 illustrates a plan view of a further modification.

In these drawings, 10 denotes stationary anchors which are in the nature of U-bolts, each having the ends of its shanks secured to a bumper or frame member 11. The link 12 of a chain is secured to one of the anchoring members and the said chain includes a link having a swivel joint 13 in order that the links on one side of the joint may turn or rotate with relation to the links on the other end of the joint. Regardless of the number of links employed in the chain, the link remote from the link 12 has a hook 14 mounted on it, which hook is intended to engage the anchoring member of the adjacent car when the cars are to be coupled together. The shank 15 and the bill 16 of the hook are of conventional type, but the outer surface of the hook at a location between the shank and the bill is provided with a beveled flange 17 whose sides converge inwardly from the outer edge and taper endwise where they merge with the bill and shank.

The inwardly tapered sides 18 and 19 are shown in Figs. 2 and 3 and the configuration results in an enlarged or thickened outer edge which increases the surface available to be grasped by the operator in manipulating the hook either while coupling or uncoupling the cars. By reason of the fact that the enlargement of the outer edge of the hook is present, the fingers of an operator may exert greater force, whereas should the cars separate while the operator is in the act of coupling, his fingers will not be in proximity to the engaging surfaces of the hook and the hook anchor. Furthermore, if the hook is in a certain position, for instance, if it were approximately vertical instead of approximately horizontal, as it is shown in Fig. 1 and the cars separated, the hook would turn with the anchor as a fulcrum, and in doing so, the fingers of the operator would slide around the beveled side surfaces of the head of the hook and would escape at the tapered ends thereof, so that, as stated, the operator will be in comparatively little danger through the manipulation of a coupler of this type.

In Fig. 4, a type of coupler is shown which is used on some mine cars, and in this form of the invention, a coupling hook 20 is stationary on a car and a link 21 is applied to or removed from the hook during the coupling and uncoupling operations. As in the previously described chain, the chain of this invention is preferably provided with a swivel 22 and the chain is suspended from a stationary car iron 23 by a clevis 24, which clevis is mounted on a pivot 25 rotatable in the apertured head 26 of the car iron. A rib 24ª connects the sides of the clevis and is integral in order that the clevis may be strengthened and be prevented from spreading. The pivot 25 has a hook 27 on one end and the said pivot and clevis move in unison when the pivot partially rotates in the head.

As shown in Fig. 6, the eye 28 of the clevis has an aperture 29 of irregular configuration and the pivot 25 has a projecting portion 30 which fits in the aperture of the clevis, so that when the pivot turns, the clevis oscillates slightly. In other words, the clevis is capable of swinging to a vertical position while the hook is turning in an upright position, in which last position it will be capable of supporting the chain that is intended to couple the cars, it being shown in the drawing in Fig. 5 that the link 21 is applied to the hook 27 and that by this means the chain is suspended.

In order that the link 21 may be manipulated expeditiously in causing it to engage or disengage the hook 20, the sides of the link are extended to form hand grasps 31 and 32, and the said hand grasps have concave sides, as shown at 33, Fig. 7. As these hand grasps are at the sides of the link, they can be manipulated without endangering the hands of the operator.

In Fig. 8 there is shown a form of coupling that is used on some mine cars in which one of the cars has a chain 34 and the other car has a chain or a link such as 35 with a hook 36 to engage a link 37 of the chain 34. When such equipment is encountered, a hook forming the subject of this invention with a link such as shown in Figs. 4 and 7 may be employed to interengage for coupling the cars, and, of course, they will be disengaged when the cars are to be uncoupled. By reason of the safety provision of a hand hold on the hook and on the link, an operator may grasp the hook by one hand and a hand grasp of the link with the other hand and by manipulating the hook and link with relation to each other may effect the desired result.

As has been previously stated, when ordinary chain couplings are employed, care must be exercised in manipulating the hooks in order that the links of the chain will not be twisted, but through the provision of the swivel joint in the chains of this invention, the links will assume proper positions with relation to each other practically regardless of the way in which the chain is manipulated.

We claim:

1. In a car coupler, a chain having a hook, the said hook having a hand hold comprising a thickened outer edge and inwardly beveled sides, the hand hold being tapered in width toward the ends of the beveled portion.

2. In a car coupler, a chain, a hook on the said chain, a member on a car to engage the hook, the said hook having a hand hold comprising a beveled flange at its member engaging end, the said flange tapering toward the ends of the beveled portion.

3. In a car coupler, a coupling element, the said coupling element having a hand hold comprising a thickened outer edge and inwardly beveled sides, the said beveled sides being unobstructed at their ends.

STEPHEN LUCHKANICH.
ALEXANDER LUCHKANICH.